Aug. 26, 1941.　　　G. B. SHANKLIN　　　2,253,985
STOP JOINT FOR GAS FILLED CABLES AND METHOD OF INSTALLING THE SAME
Original Filed Aug. 10, 1938
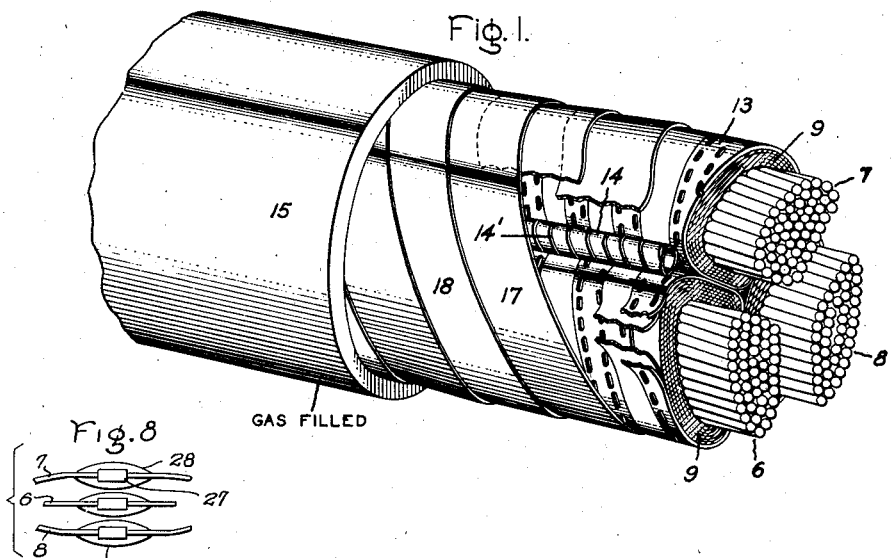
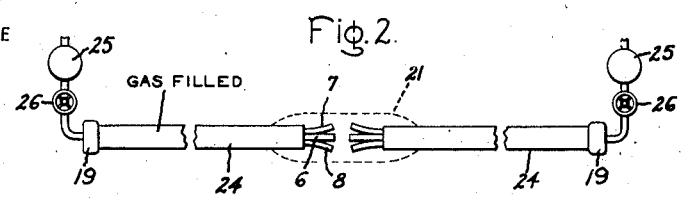
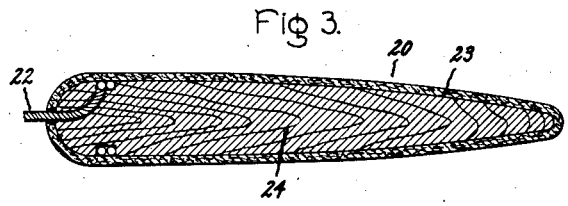
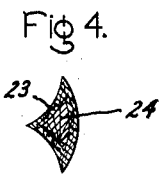
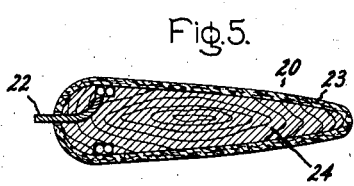
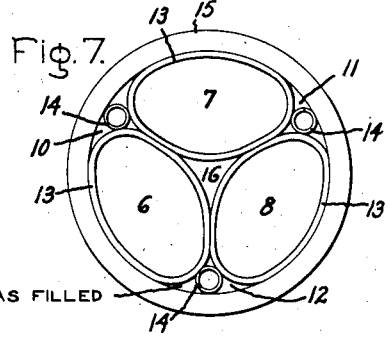
Inventor:
George B. Shanklin,
by *Harry E. Dunham*
His Attorney.

Patented Aug. 26, 1941

2,253,985

UNITED STATES PATENT OFFICE 2,253,985

STOP JOINT FOR GAS FILLED CABLES AND METHOD OF INSTALLING THE SAME

George B. Shanklin, Schenectady, N. Y., assignor to General Electric Company, a corporation of New York Original application August 10, 1938, Serial No. 224,170. Divided and this application January 31, 1940, Serial No. 316,531

5 Claims. (Cl. 174—10)

The present application is a division of my prior application, Serial No. 224,170, filed August 10, 1938, and is made under the requirements of the United States Patent Office.

The present invention is directed to gas filled cables and specifically to the means for preventing the escape of gas from the ends of cable lengths during jointing or splicing operations.

The object of my invention is the provision of improved means for closing the open ends of cables filled with gas under positive pressure during jointing or splicing operations, and an improved method of procedure for such operations.

For a consideration of what I believe to be novel and my invention, attention is directed to the accompanying specifications and the claims appended thereto.

In the accompanying drawing, which is illustrative of my invention, Fig. 1 is a perspective view of a gas filled cable to which my improvements are applicable; Fig. 2 is a view illustrating a pair of cables in position for jointing or splicing; Fig. 3 is a longitudinal sectional view of a removable plug for closing the open end of a free feed gas conveying channel located directly under the sheath; Fig. 4 is a cross-sectional view of the same; Fig. 5 is a longitudinal sectional view of a plug for closing the open end of a centrally located free feed gas conveying channel; Fig. 6 is a cross-sectional view of the same; Fig. 7 is a simplified or schematic drawing illustrating the arrangement of the conductors within the sheath, and Fig. 8 is a detail view illustrating the connectors for the conductors.

Referring to Fig. 1, 6, 7, and 8 indicate stranded conductors for conveying electric current, and in the valleys between adjacent coverings on the conductors are free feed gas channels to be referred to later. Each conductor is of sector shape and surrounded by a body 9 of porous insulation of which paper is an example. It is desirable to make the conductors of segmental shape so as to reduce the outside diameter of the cable but other shapes may be employed. Surrounding each body of insulation is a perforated electrostatic shield 13, the several shields being in contact with each other for a substantial portion of their outer surfaces. The insulation on the conductors is impregnated by a suitable compound which, among other characteristics, has little tendency to flow even when heated as set forth in my aforesaid application. The compound at some stage in the manufacture of the cable is drained as fully as possible from the insulation, that which remains in the insulation being retained by capillary action. Among other things, the purpose of draining is to ensure that the gas channels shall be free of compound which if present in substantial amount would tend to form slugs therein and restrict the freedom of the gas to flow and to fully act on the impregnated insulation. The valleys between pairs of adjacent conductor coverings form or define free feed gas containing channels 10, 11 and 12. Located in each channel is a tube 14. These tubes serve a double function as they act as free feed gas channels or parts thereof and also as supports for the enclosing imperforate sheath 15 made of lead or other suitable material. Because the tubes are intended to supply gas freely to the insulation and to the interior of the sheath, they are perforated. A simple way to do this is to spirally wind a thin ribbon of steel or other metal to form a small diameter tube with small spaces 14' between the turns to permit the gas to freely issue therefrom. In service, the tubes and interior of the sheath are filled with low pressure insulating gas of the order of 15 to 20 pounds per square inch. Desirably, the pressure of the gas is kept low so as not to stretch the sheath, and for that reason no reinforcement is necessary. As an example, nitrogen gas may be employed but my invention is not limited to any specific gas so long as it is of a character not to adversely affect the contents of the sheath. Ordinarily, it is desirable to use the metallic tubes 14 to support the sheath on account of the necessity of reeling and unreeling of the cable from the shipping drums but such tubes are not necessary in all cases. Whether they are used or not, four definite free feed gas channels are provided, three of them 10, 11 and 12 are directly under the sheath and the fourth, designated by 16, is in the center between conductor coverings. In the case of the outer channels, the walls thereof are defined in part by the conductor coverings and in part by the inner wall of the sheath. In the case of the center channel, its walls are defined by the conductor coverings.

Surrounding the conductors is a metallic binding band 17 with ribbons of paper or other insulating material 18 in interlocking relation therewith so as to reduce the tendency of the turns of the band 17 to slip, as set forth in the patent to Hayman No. 1,751,403, issued March 18, 1930. In this connection, it is to be understood that the cables during some stage of the manufacture are coiled on reels or drums and afterwards shipped to the customer. As shipped, the cable is filled with gas under low positive pressure so that any leakage is outward and not inward. Because gas under pressure is employed, it is not necessary to use pressure tanks during shipment. They are employed, however, during installation and usually when the cable is in operation.

As will be seen from Fig. 7, there are outer channels 10, 11 and 12 located between the conductor coverings and the smooth inner wall of the sheath forming free feed gas channels. The said coverings are also relatively smooth. In the center of the cable is a triangular space 16, the walls of which are relatively smooth and are wholly defined by the conductor coverings and form a free feed gas channel. These channels are filled with low pressure gas at all times which include the period between manufacture of the cable and its installation in the circuits of the user. To prevent the escape of gas, the ends of each cable length during shipment are provided with suitable closures or caps such as are indicated at 19 in Fig. 2, those on the adjacent ends having been removed for jointing.

To prevent excessive loss of gas during jointing or splicing operations when adjacent caps have to be removed, it is necessary to close the exposed ends of the free feed gas channels. A simple and cheap means for temporarily shutting off the outward flow or escape of gas during the jointing of the cable lengths in the field is to employ temporary plugs as illustrated on an enlarged scale in Figs. 3 to 6 inclusive. The means comprise temporary plugs 20 adapted forcibly to be inserted in the ends of the free feed gas channels at the cable ends and which are subsequently removed to establish through connections between cable lengths by means of the joint casings. 21. The temporary plugs may be removed before the joint casing is applied, or afterwards by means of a cord 22 fastened thereto, the cord extending outwardly through any one of the usual openings in the joint casing and through which the temporary plugs may be removed. The casing openings are normally closed by screw threaded gasketed plugs, as usual in cable joints. This arrangement results in a saving of gas.

The temporary plugs should be soft and pliable and may be preformed to snugly fit into the irregularly shaped spaces in the center between conductors as well as between the conductors and sheath. The plugs should be more or less impervious to gas escape. For example, they may be made of impregnated felt or wool 23, either with or without a supporting core 24. Other kinds of material having the characteristics of elasticity which are neutral with respect to the sheath contents may be employed. However the plug is formed, it should hold itself by friction in the filler space against the gas pressure. The gas which is at super atmospheric pressure may during jointing operations be maintained at full working pressure if the temporary plugs are tightly seated or the gas pressure may be temporarily reduced to ensure that the plugs will not be blown out. The minimum pressure is desirably at all times greater than atmospheric so as to prevent the entrance of air and moisture. In this connection, it should be remembered that at some stage in the manufacture the insulation and the compound within the cable sheath have been degasified which renders them more susceptible to the objectionable action of air and moisture. Where the gas channels contain metal elements, such as 14, Fig. 1, the action of inserting the plugs may compress the tubes endwise, which is permitted by the spaces between turns, or a short length may be pulled out and then cut off and the remainder pushed back inside of the end of the lead sheath to afford the necessary space.

In Fig. 2 is illustrated two lengths 24 of cable which have been laid ready for jointing. The outer ends of the lengths have caps 19 sealed to the sheath, and to each is connected a tank 25 containing neutral gas in sufficient amount and under sufficient positive pressure to feed gas through the channel or channels toward the joint to prevent entrance of foreign matter during the jointing operations, subject to the control of valves 26. To prevent escape of gas through the channels during such operations, the temporary plugs already described are inserted therein. The adjacent ends of the conductors will be united in the usual way by connectors 27 after which reinforcement insulating tapings 28 and metal tape shields similar to 13 will be applied and finally a casing 21, shown in dotted lines, will be sealed at its ends to the sheaths. Additional lengths will be connected in a similar manner, each added length having its own temporary gas tank 25. Gas under pressure for the connected lengths may be supplied from the tank at one or both ends or additional tanks may be provided and connected to intermediate joint casings where the line is of substantial length. The temporary plugs should remain in place during the period of time required to unite the connectors 27 with the corresponding aligned conductor ends and also while the reinforcement insulating tapings 28 and shields are applied. These operations require a considerable period of time to complete as the job is one calling for very careful workmanship. By reason of the special character of the plugs and their arrangement, they do not interfere with the jointing or splicing operations and what is of primary importance, they are readily and independently removable after all of the jointing operations are completed, thereby conserving the gas within the channels to the maximum. The insertability and removability of the plugs is facilitated by the fact that the conductors are splayed which means that tapered or wedge shaped spaces are formed between them. Furthermore, by preforming the plugs to the approximate triangular shape of the channels, as shown in Figs. 3 to 6, as well as tapered, their insertion and removal is facilitated. It is to be noted that the conductors are naturally stiff and that when the ends are united by the connectors, they become practically immovable, and also that the wedge shaped spaces between the splayed ends of the conductors are not usually identical in size and shape due to the fact that the conductors have to be bent outwardly by hand to permit of the application of the connectors and their insulations. When the plugs are inserted, a portion of each will be located in a channel within the confines of the sheath and the remainder between the splayed ends of the conductors. It is important that each plug shall be of such character that it can be quickly inserted or removed since any delay in these operations will result in a substantial loss of gas from the channels.

Desirably, in jointing or splicing gas filled cables, the gas tanks 25 are connected to the remote ends of two cable lengths, as shown in Fig. 2, before cutting so as to ensure an adequate supply of gas under suitable pressure. After this, the cap on the end of the cable length to be jointed is removed as by cutting off the end of the cable to which it is attached. As soon as this is done, temporary plugs are quickly inserted in the open or exposed ends of the gas channels. If desired, the gas pressure may be reduced by adjusting the valve 26 before the cutting operation is started. Having temporarily closed the ends of the gas channels, the next step is to cut back or remove the sheath for a suitable distance to expose the conductors 6, 7 and 8, as indicated in Fig. 2. As soon as the sheath is cut back or removed, a second set of temporary channel closing means may be applied because at this stage in the splicing operation the gas channels are again opened at the ends remote from the tanks. If the gas pressure is sufficiently reduced and the short sheath end quickly removed, it is not always necessary to use two sets of plugs or channel closing means or plugs since what have been here designated as the second set of plugs will suffice. However, if there is to be any delay in the jointing operations, it is safer to use two sets of plugs. The main idea is, of course, to conserve gas as fully as possible.

I have described my invention in connection with a cable in which all of the valleys between conductor coverings are utilized as free feed gas channels for the purpose of obtaining the maximum cross-sectional area for the gas with a minimum diameter of the sheath but where for any reason an area of such size is not required, some but not all of the valleys may be filled in whole or in part by what are termed "fillers" in the cable art.

What I claim as new and desire to secure by Letters Patent of the United States, is:

1. Steps in the method of jointing individually sealed lengths of cable, each having insulated multi-conductors, the insulation being impregnated with a liquid compound which has little tendency to bleed and is retained therein by capillary action, an impervious metallic sheath, gas conveying channels therein which are normally free of compound but act to receive compound bleeding from the insulation, and a filling for the sheath and channels of insulating gas under super atmospheric pressure which comprise opening an end of a cable length to expose the gas channels, inserting temporary sealing plugs in the exposed ends of the channels to stop outward flow of gas therefrom, removing a short piece of the sheath adjacent the end to expose the conductors and their coverings, inserting a second set of temporary sealing plugs in the outer gas channels, removing the first set of plugs, similarly treating the other cable, jointing and insulating corresponding conductors, removing the second set of plugs, enclosing the joints in a casing, and subsequently sealing the casing.

2. A cable joint comprising lengths of insulated multiple conductors, an enclosing sheath for each length, the inner wall of which with the outer surfaces of the conductors defines longitudinally extending free channels, the ends of the conductors extending beyond the ends of the sheaths and outwardly splayed to increase the spaces between them, a filling of gas under positive pressure for the channels and sheaths, insulated connectors uniting corresponding conductor ends of the lengths, temporary individual insertable and removable compressible plugs, the inner ends of which tightly fill the channels within the confines of the sheath ends, the said plugs being located on opposite sides of the connectors and being removable without disturbing the positions of the cable ends and the connectors, and a casing enclosing the joints.

3. A cable comprising lengths of multiple conductors, a covering of insulation on each of the conductors, portions of which are in contact with other coverings, there being free channels located between peripheral surfaces of the coverings, an enclosing sheath, the inner surface of which defines the outer walls of the channels, a filling of insulating gas under positive pressure for the sheath and channels, insulated connectors for permanently uniting the adjacent ends of each pair of conductors, preformed removable compressible plugs of substantially triangular cross-section independently inserted into the ends of the channels and engaging the coverings of a pair of adjacent conductors and the inner wall of the sheath and temporarily retained therein to prevent free escape of gas during splicing, the said plugs being located on opposite sides of the connectors and removable without disturbing the connectors and their insulated coverings, and a gas tight casing for the joints.

4. A cable joint comprising lengths of insulated multiple conductors having splayed ends defining wedge shaped spaces, an enclosing sheath for each length terminating a short distance from the conductor ends and defining the outer walls of channels located between the conductors, a filling of gas under positive pressure in the channels which flows outwardly when the cables are cut preparatory to splicing, a removable filling of compressible material for each channel, which enters the channel within the sheath to stop outward flow of gas, a casing for the joint sealed at its ends to the sheaths of the lengths, and means for removing the compressible material from the channel ends so that gas in the channels of one length is free to enter those of the connected length.

5. Steps in the method of jointing individually sealed lengths of multi-conductor cables, each length having insulated conductors, an impervious metallic sheath, longitudinally extending gas channels, a filling of insulating gas under positive pressure for the sheaths and channels, and an end cap sealed to the sheath, which comprises removing the cap to expose the ends of the channels, applying means to the end of the cable to stop the outward flow of gas from the channels, removing a short piece of the sheath to expose the insulated conductors and portions of the channels, inserting temporary sealing plugs in the ends of the channels, which are exposed by the removal of the piece of the sheath, removing the means from the end of the length, similarly treating the other cable length, jointing and insulating corresponding conductors, removing the sealing plugs, and enclosing the joints in a gas tight casing.

GEORGE B. SHANKLIN.